US010023705B2

(12) United States Patent
Kharul et al.

(10) Patent No.: US 10,023,705 B2
(45) Date of Patent: Jul. 17, 2018

(54) CO-ABPBI MEMBRANES AND PROCESS FOR THE PREPARATION THEREOF

(71) Applicant: Council of Scientific & Industrial Research, New Delhi (IN)

(72) Inventors: Ulhas Kanhaiyalal Kharul, Pune (IN); Kurungot Sreekumar, Pune (IN); Harshal Dilip Chaudhari, Pune (IN); Vinaya Bhagwat Ghodake, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/915,346

(22) PCT Filed: Sep. 1, 2014

(86) PCT No.: PCT/IN2014/000559
§ 371 (c)(1),
(2) Date: Feb. 29, 2016

(87) PCT Pub. No.: WO2015/029070
PCT Pub. Date: Mar. 5, 2015

(65) Prior Publication Data
US 2016/0215110 A1    Jul. 28, 2016

(30) Foreign Application Priority Data
Aug. 30, 2013 (IN) .......................... 2569/DEL/2013

(51) Int. Cl.
*C08J 5/18*     (2006.01)
*H01M 8/103*    (2016.01)
(Continued)

(52) U.S. Cl.
CPC .............. *C08J 5/18* (2013.01); *B01D 53/228* (2013.01); *B01D 67/0002* (2013.01);
(Continued)

(58) Field of Classification Search
USPC ............................................... 521/27; 429/12
See application file for complete search history.

(56) References Cited

U.S. PATENT DOCUMENTS

2007/0292734 A1* 12/2007 Kiefer ................ B01D 67/0093
                                                      429/494
2008/0057358 A1*  3/2008 Calundann ......... B01D 67/0006
                                                      429/483

OTHER PUBLICATIONS

Yang et al. (Polymer International, vol. 59, pp. 1695-1700 (2010)).*
(Continued)

*Primary Examiner* — Mark Kaucher
*Assistant Examiner* — Henry Hu
(74) *Attorney, Agent, or Firm* — Seyfarth Shaw LLP

(57) ABSTRACT

Disclosed herein is co-ABPBI membranes comprising co-ABPBI of formula (I), Invention discloses a sol gel process for the synthesis of membranes comprising co-ABPBI of formula (I).

Formula-I

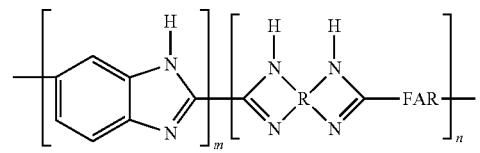

2 Claims, 2 Drawing Sheets

(51) Int. Cl.
*B01D 53/22* (2006.01)
*C08J 5/22* (2006.01)
*H01M 8/1072* (2016.01)
*H01G 11/52* (2013.01)
*B01D 67/00* (2006.01)
*B01D 71/62* (2006.01)
*C08G 73/18* (2006.01)
*H01M 8/1004* (2016.01)
*H01M 8/1081* (2016.01)

(52) U.S. Cl.
CPC .............. *B01D 71/62* (2013.01); *C08G 73/18* (2013.01); *C08J 5/2256* (2013.01); *H01G 11/52* (2013.01); *H01M 8/103* (2013.01); *H01M 8/1004* (2013.01); *H01M 8/1072* (2013.01); *H01M 8/1074* (2013.01); *C08J 2379/04* (2013.01); *H01M 8/1081* (2013.01); *Y02E 60/13* (2013.01); *Y02P 70/56* (2015.11)

(56) References Cited

OTHER PUBLICATIONS

Kim et al. (Macromolecular Materials and Engineering, vol. 293, pp. 914-921 (2008)).*
Kim, S-K., et al., "Copolymers of Poly(2,5-benzimidazole) and Poly[2,2'-{p-phenyiene}-5,5'-bibenzimidazole] for High-Temperature Fuel Cell Applications", Macromolecular Materials and Engineering 293: 914-921 [2008].*
Yang, J, et al., "A Copolymer of Poly[2,2'-(m-phenylene)-5,5'-bibenzimidazole] and poly (2,5-benzimidazole) for High-Temperature Proton-Conducting Membranes," Polym. Int., 59: 1695-1700 (2010).*
Kim, S, K, et al., "Cross-linked poly(2,5-benzimidazole) consisting of wholly aromatic groups for high-temperature PEM fuel ceil applications", Journal of Membrane Science, 373: 80-88 (2011).*
Asensio, J.A., et al., "Recent Development on Proton Conducting Poly (2,5-benzimidazole) (ABPBI) Membranes for High Temperature Polymer Electrolyte Membrane Fuel Cells," *Fuel Cells* 5 (3): 336-343 (2005).
Cho, J. et al., "Structure of a Poly(2,5-benzimidazole)/Phosphoric Acid Complex," *Journal of Polymer Science: Part B: Polymer Physics*, 42: 2576-2585 (2004).
Asensio, J. A., et al., "Proton-Conducting Membranes Based on Poly(2,5-benzimidazole) (ABPBI) and Phosphoric Acid Prepared by Direct Acid Casting," *J. Membrane Sci.* 241: 89-93 (2004).
YU, S., et al., "Synthesis of Poly (2,2'-(1,4-phenylene) 5,5'-bibenzimidazole) (para-PBI) and Phosphoric Acid Doped Membrane for Fuels Cells," *Fuel Cells* 9 (4): 318-324 (2009).
Kim, S-K., et al., "Copolymers of Poly(2,5-benzimidazole) and Poly [2,2'-(p-phenylene)-5,5'-bibenzimidazole] for High-Temperature Fuel Cell Applications$^a$," *Macromolecular Materials and Engineering* 293:914-921 (2008).
Yang, J. et al., "A Copolymer of Poly[2,2'-(m-phenylene)-5,5'-bibenzimidazole] and ply (2,5-benzimidazole) for High-Temperature Proton-Conducting Membranes," *Polym. Int.* 59: 1695-1700 (2010).
Yang, J. et al., "A copolymer of poly[2,2'-(m-phenylene)-5,5'-bibenzimidazole] and poly(2,5-benzimidazole) for high-temperature proton-conducting membranes," *Polymer International* 59: 1695-1700 (2010).
Kim, S. K., et al., "Cross-linked poly(2,5-benzimidazole) consisting of wholly aromatic groups for high-temperature PEM fuel cell applications," *Journal of Membrane Science* 373: 80-88 ( 2011).
International Search Report dated Dec. 19, 2014, issued in PCT/IN2014/000559.

\* cited by examiner

CO-ABPBI MEMBRANES AND PROCESS FOR THE PREPARATION THEREOF

FIELD OF THE INVENTION

The present invention relates to co-ABPBI membranes comprising co-ABPBI of formula I. Particularly, the invention discloses a sol gel process for the synthesis of membranes comprising co-ABPBI of formula I.

Formula I

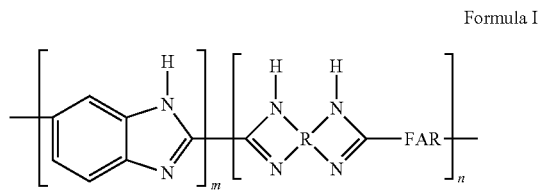

BACKGROUND AND PRIOR ART OF THE INVENTION

A Polybenzimidazole (PBI) membrane impregnated with phosphoric acid is a state of art of high temperature polymer electrolyte membrane for fuel cell (HT-PEMFC). Conventional PBI is not simple to prepare and involves immense economic inputs. Moreover, its monomer is a known carcinogen. Among the family of PBIs, ABPBI is one of the best choices to be applicable as a membrane material in HT-PEMFC. However, less attention has been paid to this polymer due to intrinsic difficulties.

Conventional ABPBI is soluble in very few solvents like strong acids and thus difficult for membrane preparation (due to the corrosive nature and high boiling points of these acids required during casting), refer Romero P. G. et al, *Fuel cell* 05 (2005) 336).

Conventionally ABPBI is synthesized from 3,4-diaminobenzoic acid (DABA) in polyphosphoric acid (PPA) as a solvent.

In most of the literature on ABPBI, membranes are prepared by solution casting method (by evaporation of methane sulphonic acid, MSA at ~200° C.). ABPBI based membranes can also be prepared by direct acid casting of MSA/ABPBI/$H_3PO_4$ solution, refer Romero P. G. et al., *JMS* 241 (2004) 89; in which the polymer solution casted on the substrate is dipped into $H_3PO_4$.

Recently J. A. Asensio et al. in *Fuel cells* 05 (2005) 336 discloses process for synthesis of ABPBI or other PBIs by self-condensation of 3,4-diaminobenzoic acid in MSA/$P_2O_5$.

Synthesis of Poly (2,2'-(1,4-phenylene) 5,5'-bibenzimidazole) (para-PBI) and Phosphoric Acid Doped Membrane for Fuel Cells is reported in *Fuel cells* (2009), 09318 by S. Yu.

Phosphoric acid impregnated ABPBI membranes were cast by Cho J. et al., from an ethanol/NaOH solution (Cho J. et al., *JPS B* 42 (2004) 2576). In this process, ABPBI needs to be dissolved in the alcoholic solution of caustic and then casting into a membrane is done. These membranes need to be doped with phosphoric acid for their use as membranes for fuel cell. Kim et al., prepared the ABPBI membranes from polymerized solution containing $CH_3SO_3H$ and $P_2O_5$ casted on glass plate, immersed in water bath and later dried under vacuum (Kim H. J. et al., *Macro. Mol. rapid comm.* 25 (2004) 894).

ABBPI copolymer with isophthalic acid based polymer was prepared by Ronghuan He's group. Membranes were prepared using DMAc as a solvent by solution casting method (He R. et al., *Poly. Int.* 59 (2010) 1695).

ABPBI copolymer with terephthalic acid was synthesized and membranes were prepared from MSA solution using casting method (Lee J. C. et al., *Macromol, Mrtl. Engg.* 296 (2008) 914). Both these methods involve multiple steps; viz.; (i) polymer synthesis (ii) its isolation (iii) dissolution in solvent (iv) membrane casting and then (v) doping with $H_3PO_4$.

There is no literature where ABPBI reaction mixture after its synthesis is used directly to cast the membranes by sol-gel method. Further, methanesulphonic acid (MSA) is required as a solvent for membrane to be formed by solution casting method, which involves evaporation of corrosive solvent. When polymerization solvent is MSA, often $P_2O_5$ or polyphosphoric acids are also used along with MSA. Though polymerization of ABPBI is known using polyphosphoric acid (PPA) as a solvent, membrane casting by conventional sol-gel process is not reported. When the inventors attempted the same, rather than obtaining a membrane (a film), the polymer phased out in the form of powder, as shown in FIG. 1. Hence preparation of ABPBI based membranes using its solution immediately after its synthesis and possessing good mechanical strength as well as acid content tuneability is a need in the art.

In the light of above, the inventors have developed rigid aromatic moiety incorporated co-ABPBI and membrane thereof in the film form by employing sol-gel method, that obviate the cumbersome and lengthy process steps described in the prior art.

OBJECTIVE OF THE INVENTION

The main object of the present invention is to provide co-ABPBI membranes comprising co-ABPBI of formula I.

Another object of the present invention is to provide an efficient process for the synthesis of co-ABPBI of formula I by copolymerizing monomer of ABPBI (3,4-diaminobenzoic acid, with rigid dicarboxylic acid and a tetramine in PPA that acts as a solvent.

Yet another object of the present invention is to provide a process for the preparation of co-ABPBI membranes by using sol-gel process, comprising ABPBI copolymer after the copolymerization performed in PPA, in the form of a film, having excellent mechanical strength and tunable acid content in the membranes.

SUMMARY OF THE INVENTION

Figure 1:
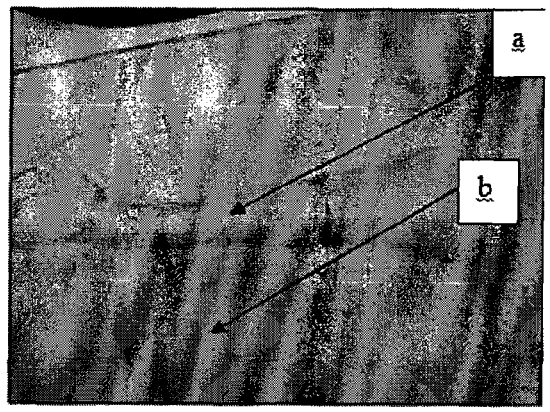
FIG. 1: depicts sol-gel membrane of ABPBI solution in polyphosphoric acid (PPA):
  a. Rather than a film, crack formation occurs, which after complete sol-gel process, turns into the powdery material.
  b. Solution yet to undergo gelation by sol-gel process.

Accordingly, present invention provides Co-ABPBI membranes comprising co-ABPBI of formula I

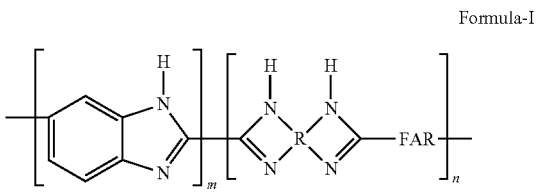

Formula-I wherein 'm and n' are repeat units; R is tetraamine monomer having general formula II, comprising compounds of formula IIa, IIb, IIc, IId, IIe, IIf and FAR is fused aromatic ring derived from dicarboxylic acid of formula III a-e or its positional isomers, salts or esters. wherein:

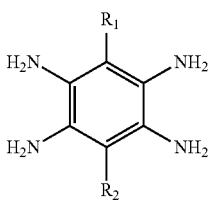

Formula-IIa wherein, $R_1$, $R_2$ is selected form a group consisting of H, $CH_3$, $CF_3$, F, Cl, Br, I, $NO_2$ or $C_{1-24}$ containing alkyl or aryl groups; or

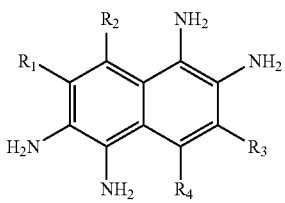

Formula-IIb wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or

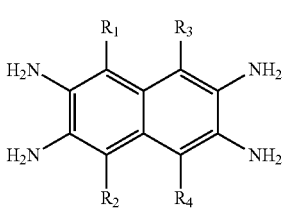

Formula-IIc wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or

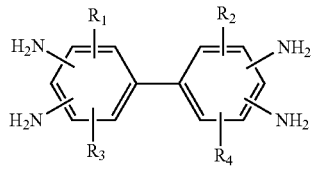

Formula-IId wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or

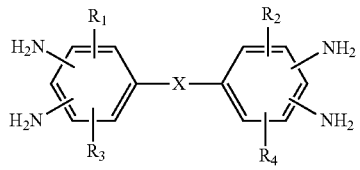

Formula-IIe wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups and X is selected from the group consisting of —$CH_2$—, —O—, —$SO_2$—, —$C(CH_3)_2$—, —$C(CF_3)_2$—, —$C(Ph)_2$-, —$CH_3C(Ph)$-, —$CH_3C(isopropyl)$-, —$CH_3C(t$-butyl)-, —$CH_3C(n$-propyl)-, —$CH_3C(ethyl)$- or any other $C_{1-24}$ containing alkyl or aryl groups; or

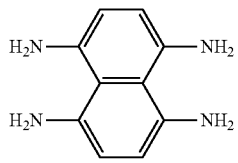

Formula-IIf and FAR (fused aromatic rings) is dicarboxylic acid having general formula III comprising compounds of formula IIIa, IIIb, IIIc, IIId and IIIe;

$$HOOC-(C_kH_mX_n)-COOH \quad \text{Formula-IIIa}$$

where, k=1-30 containing fused aromatic ring (containing phenyl, pyridine, pyrazine, furan, quinoline, thiophene or appropriate aromatic rings containing hetero-aromatic fused ring systems) substituted with alkyl, aryl, arylene, alkylene, arylene-ether or heterocyclic groups as straight chain, branched, cyclic, aromatic or combination thereof; X=O, N, S, halogen or combination thereof, n=0-10 and m=appropriate numbers of hydrogen; or

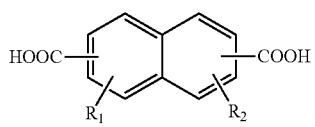

Formula-IIIb wherein; $R_1$, $R_2$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group consisting of pyridine, pyrazine, furan, quinoline, thiopene groups; or

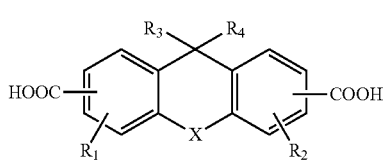

Formula-IIIc where; $R_1$, $R_2$, $R_3$, $R_4$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group pyridine, pyrazine, furan, quinoline, thiopene groups and X is selected from the group consisting of —$CH_2$—, —O—, —$SO_2$—, —$C(CH_3)_2$—, —$C(CF_3)_2$—, —$C(Ph)_2$-, —$CH_3C(Ph)$-, —$CH_3C(isopropyl)$-, —$CH_3C(t$-butyl)-, —$CH_3C(n$-propyl)-, —$CH_3C(ethyl)$- or $C_{1-15}$ containing alkyl or aryl groups.

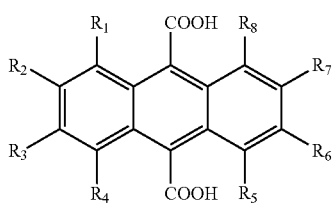

Formula-IIId where; $R_1$, $R_2$, $R_3$, $R_4$, $R_5$, $R_6$, $R_7$, $R_8$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups.

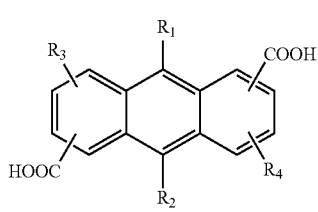

Formula-IIIe where; $R_1$, $R_2$, $R_3$, $R_4$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group consisting of pyridine, pyrazine, furan, quinoline, thiopene groups In an embodiment, present invention provides a process for the preparation of Co-ABPBI membranes comprising the steps of
a. heating PPA with stirring at 100-140° C. under constant flow of nitrogen followed by addition of 50 to 99 mol. % of 3,4-diaminobenzoic acid (DABA) and 1 to 50 mol. % of dicarboxylic acid of formula III(a-e) to obtain the reaction mixture;
b. increasing the temperature of the reaction mixture obtained in step (a) slowly to 170° C. and maintaining it for 10 min to 10 hours;
c. lowering the temperature of reaction mixture of step (b) to 140° C. and adding 1 to 50 mol. % tetramine of formula II(a-f), while maintaining the temperature for 10 min to 5 hours and;
d. increasing the temperature of the reaction mixture of step (c) to 170° C., maintaining it for 10 min to 5 h, followed by raising the temperature to 190-210° C. and maintaining it for 10 min to 14 h to obtain the co-ABPBI of Formula-I.
e. adding water and phosphoric acid to the reaction mixture in the ratio 0:100 to 100:0 to the reaction mixture of co-ABPBI of formula-I followed by stirring for 10 min-10 h;
f. degassing the solution of step (e) for 5-60 min to remove entrapped air and casting it on an appropriate support such as glass plate, or glass fabric, or Teflon paper, or Polyetheretherketone (PEEK)
g. keeping the membranes obtained in step (f) above in humidity chamber at 20-95% RH, −10-60° C. and 1-48 h for hydrolysis of PAA to obtain the membranes; and
h. optionally vacuum drying the hydrolyzed membranes obtained in step (d) at 40-150° C. to obtain the desired product.

In yet another embodiment of the present invention, said membrane is useful for electrochemical devices including fuel cell, supercapacitor, etc. and for liquid and gas separations.

DETAILED DESCRIPTION OF THE INVENTION

The present invention provides co-ABPBI membranes comprising co-ABPBI of formula I

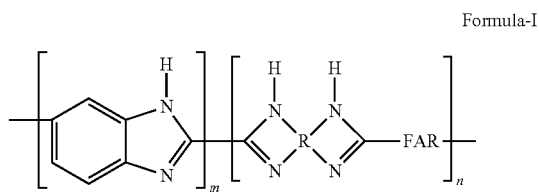

Formula-I

Wherein 'm and n' are repeat units;

The co-ABPBI is a copolymer of formula I, derived from 3,4-diaminobenzoic acid, R is tetraamine monomer having general formula II, comprising compounds of formula IIc, IId, IIe, IIf and FAR is fused aromatic ring derived from dicarboxylic acid of formula III (a)-III(e) or its positional isomers, salts or esters.

wherein:

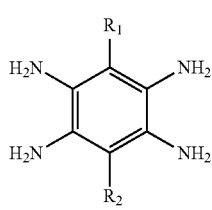

Formula-IIa wherein, $R_1$, $R_2$ is selected form a group consisting of H, $CH_3$, $CF_3$, F, Cl, Br, I, $NO_2$ or $C_{1-24}$ containing alkyl or aryl groups; or

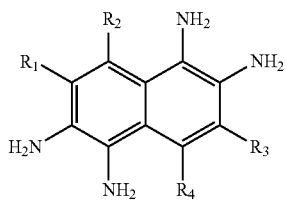

Formula-IIb wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or

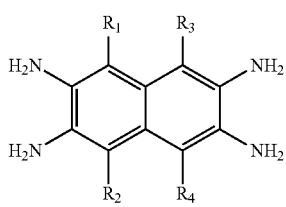

Formula-IIc wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or

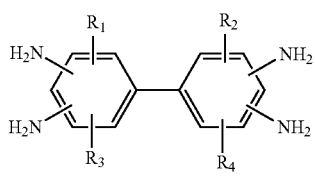

Formula-IId wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or

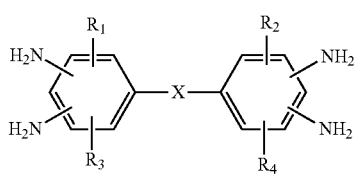

Formula-IIe wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups and X is selected from the group consisting of $—CH_2—$, $—O—$, $—SO_2—$, $—C(CH_3)_2—$, $—C(CF_3)_2—$, $—C(Ph)_2$-, $—CH_3C(Ph)$-, $—CH_3C(isopropyl)$-, $—CH_3C(t-butyl)$-, $—CH_3C(n-propyl)$-, $—CH_3C(ethyl)$- or any other $C_{1-24}$ containing alkyl or aryl groups; or

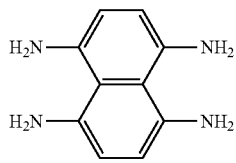

Formula-IIf and FAR (fused aromatic rings) is dicarboxylic acid having general formula III comprising compounds of formula IIIc, IIIb, IIIc, IIId and IIIe;

$$HOOC—(C_kH_mX_n)—COOH \quad \text{Formula-IIIa}$$

where, k=1-30 containing fused aromatic ring (containing phenyl, pyridine, pyrazine, furan, quinoline, thiophene or appropriate aromatic rings containing hetero-aromatic fused ring systems) substituted with alkyl, aryl, arylene, alkylene, arylene-ether or heterocyclic groups as straight chain, branched, cyclic, aromatic or combination thereof; X=O, N, S, halogen or combination thereof, n=0-10 and m=appropriate numbers of hydrogen; or

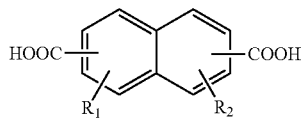

Formula-IIIb wherein; $R_1$, $R_2$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group consisting of pyridine, pyrazine, furan, quinoline, thiopene groups; or

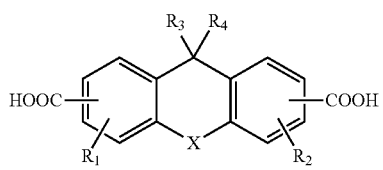

Formula-IIIc where; $R_1$, $R_2$, $R_3$, $R_4$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group pyridine, pyrazine, furan, quinoline, thiopene groups and X is selected from the group consisting of $—CH_2—$, $—O—$, $—SO_2—$, $—C(CH_3)_2—$, $—C(CF_3)_2—$, $—C(Ph)_2$-, $—CH_3C(Ph)$-, $—CH_3C(isopropyl)$-, $—CH_3C(t-butyl)$-, $—CH_3C(n-propyl)$-, $—CH_3C(ethyl)$- or $C_{1-15}$ containing alkyl or aryl groups.

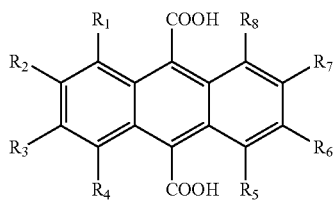

Formula-IIId where; $R_1, R_2, R_3, R_4, R_5, R_6, R_7, R_8$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups.

Formula-IIIe

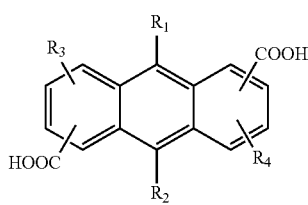

where; $R_1, R_2, R_3, R_4$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group consisting of pyridine, pyrazine, furan, quinoline, thiopene groups.

The process for the synthesis of Co-ABPBI compound of Formula I and membranes thereof comprises following steps:

a. heating PPA with stirring at 100-140° C. under constant flow of nitrogen followed by addition of 3,4-diaminobenzoic acid (DABA) and dicarboxylic acid of formula III(a-e) to obtain the reaction mixture;
b. increasing the temperature of the reaction mixture obtained in step (a) slowly to 170° C. and maintaining it for 10 min to 10 hours;
c. lowering the temperature of reaction mixture of step (b) to 140° C. and adding tetramine of formula II(a-f), while maintaining the temperature for 10 min to 5 hours and;
d. increasing the temperature of the reaction mixture of step (c) to 170° C., maintaining it for 10 min to 5 h, followed by raising the temperature to 190-210° C. and maintaining it for 10 min to 14 h to obtain the co-ABPBI of Formula-I.
e. adding water and phosphoric acid to the reaction mixture in the ratio 0:100 to 100:0 to the reaction mixture of co-ABPBI of formula-I followed by stirring for 10 min-10 h;
f. degassing the solution of step (e) for 5-60 min to remove entrapped air and casting it on an appropriate support such as glass plate, or glass fabric, or Teflon paper, or Polyetheretherketone (PEEK)
g. keeping the membranes obtained in step (f) above in humidity chamber at 20-95% RH, −10-60° C. and 1-48 h for hydrolysis of PAA to obtain the membranes; and
h. optionally vacuum drying the hydrolyzed membranes obtained in step (d) at 40-150° C. to obtain the desired product.

In the instant invention, co-ABPBI is synthesized using 3,4-diaminobenzoic acid, 3,3'-diaminobenzidine and naphthalene dicarboxylic acid (in varying proportions) in PPA as the solvent. Membranes were casted from this copolymer solution on suitable substrate such gas glass plate, or glass fabric, or Teflon paper, etc. and phased out in controlled humidity and temperature conditions. The hydrolyzed membranes were then optionally vacuum dried. Due to the incorporation of rigid naphthalene following benefits/advantages were achieved:

a. Co-ABPBI solution in PPA could be used immediately after its synthesis for membrane preparation by sol-gel process. Thus the following are avoided: polymer isolation, its purification, re-dissolution, membrane casting involving solvent evaporation or immersing in nonsolvent such as water solution and then doping with phosphoric acid; reducing number of steps as known in the literature.
b. The membrane could be prepared by sol-gel method in the film form, without powder formation; as usually found without use of naphthalene dicarboxylic acid. Thus formed sol-gel membranes showed membrane forming ability possessing excellent mechanical strength of the membrane with do not tear easily.
c. The acid content may be tuned by varying sol-gel conditions.

The synthesized Co-ABPBI membrane is characterized by the inherent viscosity, doping level analysis, ionic conductivity, mechanical property and fuel cell performance.

In another embodiment, the membrane disclosed herein finds application in various areas of filtration, fuel cells, super capacitors, Li-ion batteries and others. With reference to example 6 and FIG. 2, it may be apparent to one skilled in the art that the membrane of the invention provides enhanced fuel cell performance.

EXAMPLES

Following examples are given by way of illustration and therefore should not be construed to limit the scope of the invention.

Example 1

Synthesis of Co-ABPBI-1

A three-neck round flask equipped with a mechanical stirrer, $N_2$ inlet and outlet was charged with 230 g of PPA and heated with stirring above 140° C. under constant flow of nitrogen. A 10 g (66 mmol) of 3,4-diaminobenzoic acid and 0.71 g (3.28 mmol) of 2,6-naphthalene dicarboxylic acid was added to the reaction mixture. The temperature was slowly raised to 170° C. and maintained for 3 h and 30 min. The temperature was lowered down to 140° C. and 0.70 g (3.28 mmol) of 3,3'-diaminobenzidine (DAB) was added while maintaining the temperature for 30 min. The temperature was then raised to 170° C. for 1 h. Further, the temperature was increased to 200° C. and maintained for 2 h 55 min. After polymerization, 52.5 g of phosphoric acid was added and stirred for 2 h 25 min. The solution was then degassed for 30 min to remove entrapped air.

Example 2

Preparation of Membrane Using Reaction Mixture of Co-ABPBI-1

The reaction mixture as prepared in Example 1 was poured on a clean surface and casted using a doctor's knife. The membranes were kept in humidity chamber at 60% RH and 35° C. for 15 h for hydrolysis of PAA. Some of the hydrolyzed membranes were vacuum dried at 100° C. For viscosity measurement, small amount of polymer was precipitated in stirred water. The precipitated polymer was then crushed, water washed, treated with aqueous sodium hydroxide and again washed with water. It was further dried at 100° C. under vacuum for 7 days. Inherent viscosity of Co-ABPBI-1 was measured using 0.2 g/dL solution in conc. $H_2SO_4$ at 35° C. The viscosity of obtained polymer was 3.6 dL/g. For doping level analysis, three small samples of the dried membrane were kept in 0.3 M NaOH solution for a 24 hrs. The change in the concentration of NaOH was determined by 0.2N oxalic acid. These samples were vacuum dried at 100° C. for 5 days. The doping level of the membrane was 8.1 mol/RU.

Example 3

Preparation of Membrane Using Reaction Mixture of Co-ABPBI-1

The reaction mixture as prepared in Example 1 was poured on a clean surface and casted using a doctor's knife. The membranes were kept in humidity chamber at 40% RH and 27° C. for 15 h for hydrolysis of PAA. Some of the hydrolyzed membranes were vacuum dried at 100° C. For viscosity measurement, small amount of polymer was precipitated in stirred, water. The precipitated polymer was then crushed, water washed, treated with aqueous sodium hydroxide and again washed with water. It was further dried at 100° C. under vacuum for 7 days. Inherent viscosity of Co-ABPBI-1 was measured using 0.2 g/dL solution in conc. $H_2SO_4$ at 35° C. The viscosity of obtained polymer was 3.0 dL/g. For doping level analysis, three small samples of the dried membrane were kept in 0.3 M NaOH solution for a 24 hrs. The change, in the concentration of NaOH was determined by 0.2 N oxalic acid. These samples were vacuum dried at 100° C. for 5 days. The doping level of the membrane was 25.1 mol/RU.

Example 4

Synthesis of Co-ABPBI-2

A three-neck round flask equipped with a mechanical stirrer, $N_2$ inlet and outlet was charged with 230 g of PPA and heated with stirring above 140° C. under constant flow of nitrogen. 10 g (66 mmol) of 3,4-diaminobenzoic acid (DABA) and 1.42 g (6.56 mmol) of 2,6-naphthalene dicarboxylic acid was added to the reaction mixture. The temperature was slowly raised to 170° C. and maintained for 3 h 30 min. The temperature was lowered down to 140° C. and 1.4 g (6.56 mmol) of 3,3'-diaminobenzidine (DAB) was added while maintaining the temperature for 30 min. The temperature was then raised to 170° C. for 1 h. Further, the temperature was increased to 200° C. and maintained for 5 h 15 min. After polymerization 82.4 g of phosphoric acid was added and stirred for 3 h 30 min. The solution was then degassed for 60 min to remove entrapped air.

Example 5

Preparation of Membrane Using Reaction Mixture of Co-ABPBI-2

The reaction mixture was poured on a clean surface and casted using a doctor's knife. The membranes were kept in humidity chamber at 80% RH, 35° C. and 24 h for hydrolysis of PAA. The hydrolyzed membranes were vacuum dried at 100° C. For viscosity measurement, small amount of polymer was precipitated in stirred water. The precipitated polymer was then crushed, water washed, treated with aqueous sodium hydroxide and, again washed with water. It was further dried at 100° C. under vacuum for 7 days. Inherent viscosity of Co-ABPBI-2 was measured using 0.2 g/dL solution in conc. $H_2SO_4$ at 35° C. The viscosity of obtained polymer was 2.94 dL/g. For doping level analysis, three small samples of the dried membrane were kept in 0.3 M NaOH solution for a 24 hrs. The change in the concen-
tration of NaOH was determined by 0.2N oxalic acid. These samples were vacuum dried at 100° C. for 5 days. The doping level was estimated by both methods, titrimetry as well as gravimetry analysis. The doping level of the membrane was 6 mol/RU.

Example 6: Electrochemical Performance of Co-ABPBI-2 Membrane Based MEA (Membrane Electrode Assembly)

Figure 2:
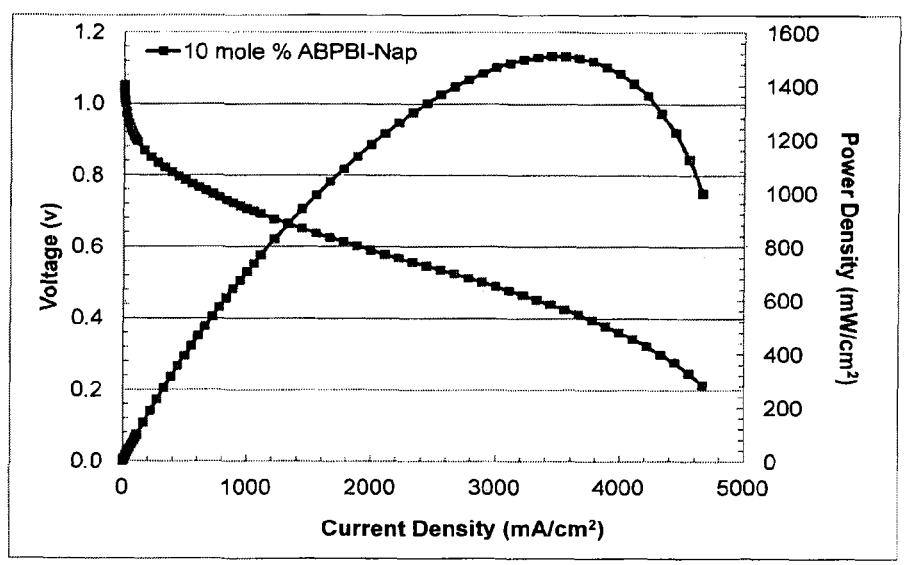
FIG. 2: Polarization graph of MEA prepared using Co-ABPBI-2 membrane (membrane preparation given in Example 5).

Membrane electrode assembly (MEA) was made by sandwiching the membrane prepared as given in Example 5 in between two electrodes prepared with the known prior art. The active area for MEA was 9 $cm^2$. The polarization graph is shown in FIG. 2, which shows that the current density at 0.6 volt is 2000 $mA/cm^2$ and peak power density is 1512 $mW/cm^2$.

Example 7: Ionic Conductivity of Co-ABPBI-2 Membrane

Figure 3:
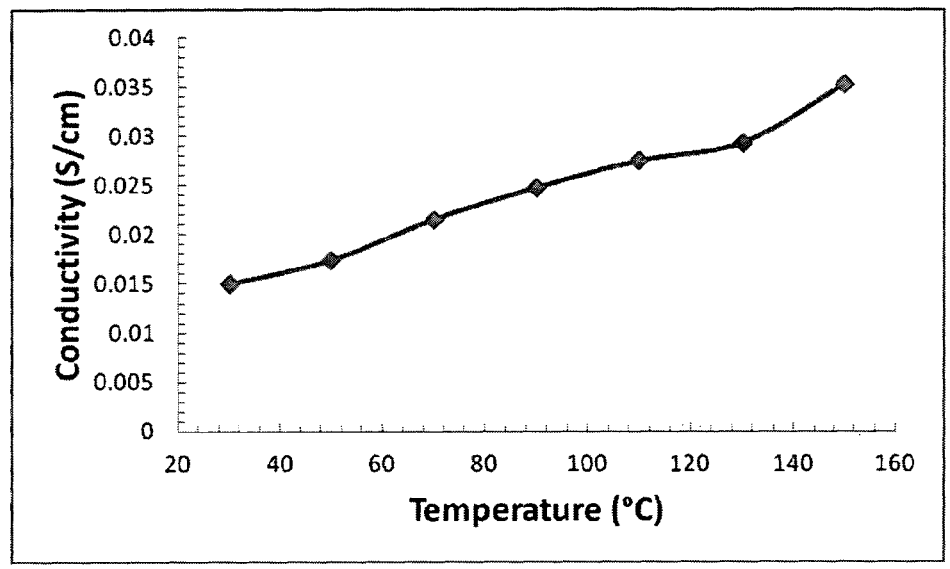
FIG. 3: Temperature dependent ionic conductivity of Co-ABPBI-2 membrane.

Ionic conductivity measurements were performed by AC impedance technique, in which membrane is sandwiched between platinum electrodes. Impedance spectra were recorded over the frequency range of 1 MHz to 0.1 Hz with potential amplitude of 10 mV at different temperatures in the range of 30-150° C. The measurements were all performed in a thermo-controlled cell under anhydrous conditions. The conductivity ($\sigma$) was calculated as follows:

$$\sigma = \frac{L}{R \times A}$$

Where R, L, and A are the measured resistance, thickness, and cross-sectional area of the membrane, respectively. The proton conductivity results are shown in Table 1 and FIG. 3.

TABLE 1

| Ionic conductivity of Co-ABPBI-2 membrane | |
|---|---|
| Temperature (° C.) | Ionic conductivity (S/cm) |
| 30 | 0.0150 |
| 50 | 0.0174 |
| 70 | 0.0216 |
| 90 | 0.0248 |
| 110 | 0.0275 |
| 130 | 0.0293 |
| 150 | 0.0352 |

Example 8: Mechanical Properties of Co-ABPBI-2 Membrane

Figure 4:
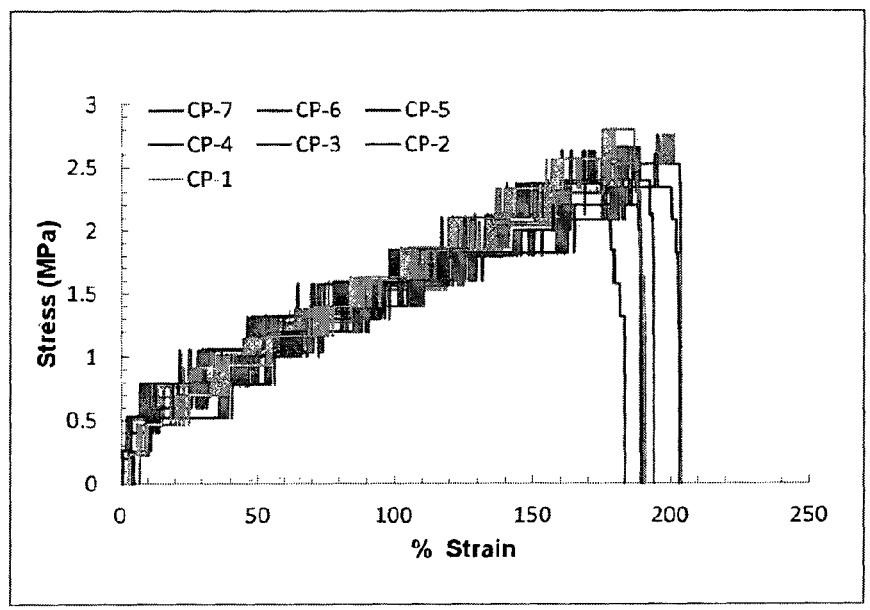
FIG. 4: Stress-strain curve showing mechanical stability of Co-ABPBI-2 membrane.

Mechanical property analyses were performed using a micro-tensile tester at room temperature and the measurements were repeated for seven samples for reproducibility. The samples were kept between the holders, tightened up to 40 Ncm and were subsequently pulled at a speed of 100 μm $s^{-1}$. Obtained stress-strain curve is shown in FIG. 4.

Advantages of the Invention

1. Process for sol-gel membranes skips several steps involved in conventional solution casting of ABPBI that involves evaporation of corrosive acidic solvents.

2. Membrane preparation by sol-gel has higher mechanical strength for the acid doped membranes and is due to incorporation of rigid aromatic structure. 3. Invention provides ease of casting. 4. The instant process allows to vary acid content in the formed membrane by merely varying sol-gel parameters.

We claim:

1. A process for the preparation of a Co-ABPBI membrane comprising the steps of:

a. heating polyphosphoric acid (PPA) with stirring at 100-140° C. under constant flow of nitrogen followed by addition of 50 to 99 mol. % of 3,4-diaminobenzoic acid (DABA) and 1 to 50 mol. % of dicarboxylic acid selected from formula IIIa-e to obtain a reaction mixture; wherein formula IIIa-e are shown below:

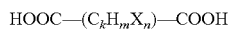

Formula-IIIa where, k=1-30 containing fused aromatic ring (containing phenyl, pyridine, pyrazine, furan, quinoline, thiophene or appropriate aromatic rings containing hetero-aromatic fused ring systems) substituted with alkyl, aryl, arylene, alkylene, arylene-ether or heterocyclic groups as straight chain, branched, cyclic, aromatic or combination thereof; X=O, N, S, halogen or combination thereof, n=0-10 and m=appropriate numbers of hydrogen; or

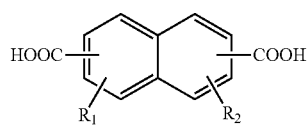

Formula-IIIb wherein; $R_1$, $R_2$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group consisting of pyridine, pyrazine, furan, quinoline, thiopene groups; or

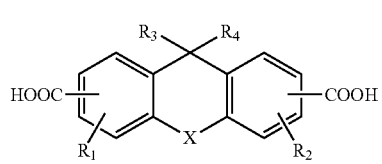

Formula-IIIc where; $R_1$, $R_2$, $R_3$, $R_4$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group pyridine, pyrazine, furan, quinoline, thiopene groups and X is selected from the group consisting of —$CH_2$—, —O—, —$SO_2$—, —$C(CH_3)_2$—, —$C(CF_3)_2$—, —$C(Ph)_2$-, —$CH_3C(Ph)$-, —$CH_3C(isopropyl)$-, —$CH_3C(t-butyl)$-, —$CH_3C(n-propyl)$-, —$CH_3C$(ethyl)- or $C_{1-15}$ containing alkyl or aryl groups

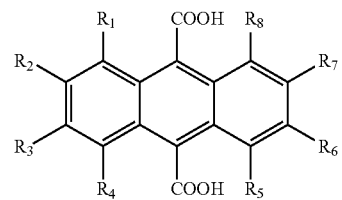

Formula-IIId where; $R_1$, $R_2$, $R_3$, $R_4$, $R_5$, $R_6$, $R_7$, $R_8$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups

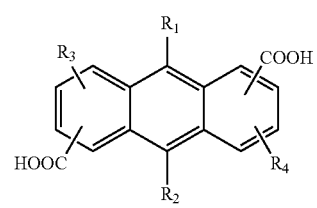

Formula-IIIe where; $R_1$, $R_2$, $R_3$, $R_4$=H, OH, O-alkyl, $CH_3$, $CF_3$, F, Cl, Br, I, $NO_2$ or $C_{1-15}$ containing alkyl, aryl, aromatic ring, arylene, alkylene, arylene-ether or heterocyclic ring selected from group consisting of pyridine, pyrazine, furan, quinoline, thiopene groups;

b. increasing the temperature of the reaction mixture obtained in step (a) to 170° C. and maintaining it for 10 min to 10 hours;

c. lowering the temperature of reaction mixture of step (b) to 140° C. and adding 1 to 50 mol. % tetraamine selected from formula IIa-f, while maintaining the temperature for 10 min to 5 hours; wherein formula IIa-f are shown below:

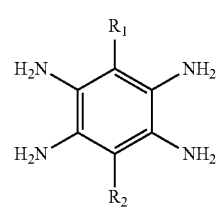

Formula-IIa wherein, $R_1$, $R_2$ is selected form a group consisting of H, $CH_3$, $CF_3$, F, Cl, Br, I, $NO_2$ or $C_{1-24}$ containing alkyl or aryl groups; or

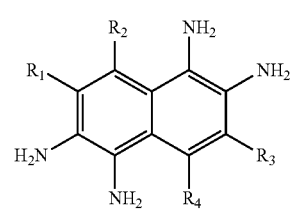

Formula-IIb wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or Formula-IIc

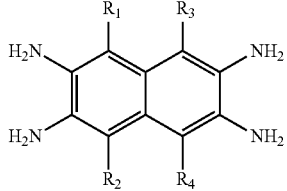

wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or Formula-IId

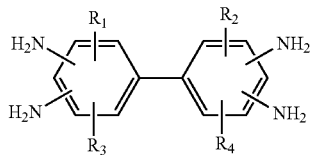

wherein, $R_1$, $R_2$, $R_3$, $R_4$ is selected form a group consisting of H, $CH_3$, $CF_3$, F, Cl, Br, I, $NO_2$ or $C_{1-24}$ alkyl or aryl groups; or Formula-IIe

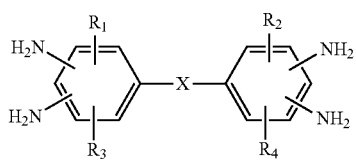

wherein, $R_1$, $R_2$, $R_3$, $R_4$ is selected form a group consisting of H, $CH_3$, $CF_3$, F, Br, I, $NO_2$ or $C_{1-24}$ alkyl or aryl groups and X is selected from the group consisting of $-CH_2-$, $-O-$, $-SO_2-$, $-C(CH_3)_2-$, $-C(CF_3)_2-$, $-C(Ph)_2-$, $-CH_3C(Ph)-$, $-CH_3C(isopropyl)-$, $-CH_3C(t-butyl)-$, $-CH_3C(n-propyl)-$, $-CH_3C(ethyl)-$ or any other $C_{1-24}$ containing alkyl or aryl groups; or Formula-IIf

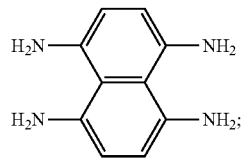

d. increasing the temperature of the reaction mixture of step (c) to 170° C., maintaining it for 10 min to 5 h, followed by raising the temperature to 190-210° C. and maintaining it for 10 min to 14 h to obtain the co-ABPBI of Formula-I, Formula-I

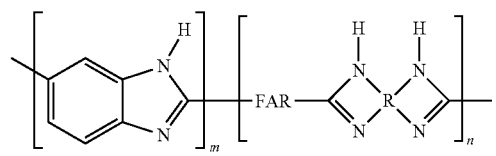

wherein m and n are repeat units; R is tetraamine monomer selected from compounds of Formula IIa-f and FAR is fused aromatic ring derived from dicarboxylic acid selected from compounds of Formula IIIa-e or its positional isomers, salts or esters;

e. adding water and phosphoric acid to the reaction mixture in the ratio 0:100 to 100:0 to the reaction mixture of co-ABPBI of formula-I followed by stirring for 10 min-10 h;

f. degassing the solution of step (e) for 5-60 min to remove entrapped air and casting it on a support to obtain a membrane;

g. keeping the membrane obtained in step (f) above in humidity chamber at 20-95% RH, −10-60° C. and 1-48 h for hydrolysis of PPA to obtain the Co-ABPBI membrane; and h. optionally vacuum drying the Co-ABPBI membrane obtained in step (g) at 40-150° C.

2. The process of claim 1, wherein in step (f) the support is selected from glass plate, glass fabric, polytetrafluoroethylene paper, and polyetheretherketone (PEEK).

* * * * *